R. L. OWENS.
FEED HOPPER FOR GRAIN CLEANING MACHINERY.
APPLICATION FILED DEC. 24, 1917.

1,400,232.

Patented Dec. 13, 1921.

WITNESSES:

INVENTOR:
RICHARD L. OWENS.
BY
ATTORNEYS

UNITED STATES PATENT OFFICE.

RICHARD L. OWENS, OF MINNEAPOLIS, MINNESOTA.

FEED-HOPPER FOR GRAIN-CLEANING MACHINERY.

1,400,232.

Specification of Letters Patent.  Patented Dec. 13, 1921.

Application filed December 24, 1917. Serial No. 208,577.

*To all whom it may concern:*

Be it known that I, RICHARD L. OWENS, a citizen of the United States, resident of Minneapolis, county of Hennepin, State of Minnesota, have invented certain new and useful Improvements in Feed-Hoppers for Grain - Cleaning Machinery, of which the following is a specification.

The object of my invention is to provide a feeding apparatus to be installed in the hopper of a grain cleaning machine which will positively prevent the grain from clogging and interrupting the operation of the machine.

A further object is to provide a feeding apparatus in which the weight of the grain in the hopper will not be sustained by the feeding apparatus itself and thereby wedging and clogging of the grain in the throat of the feed is prevented.

Other objects of the invention will appear from the following detailed description.

Figure 1:
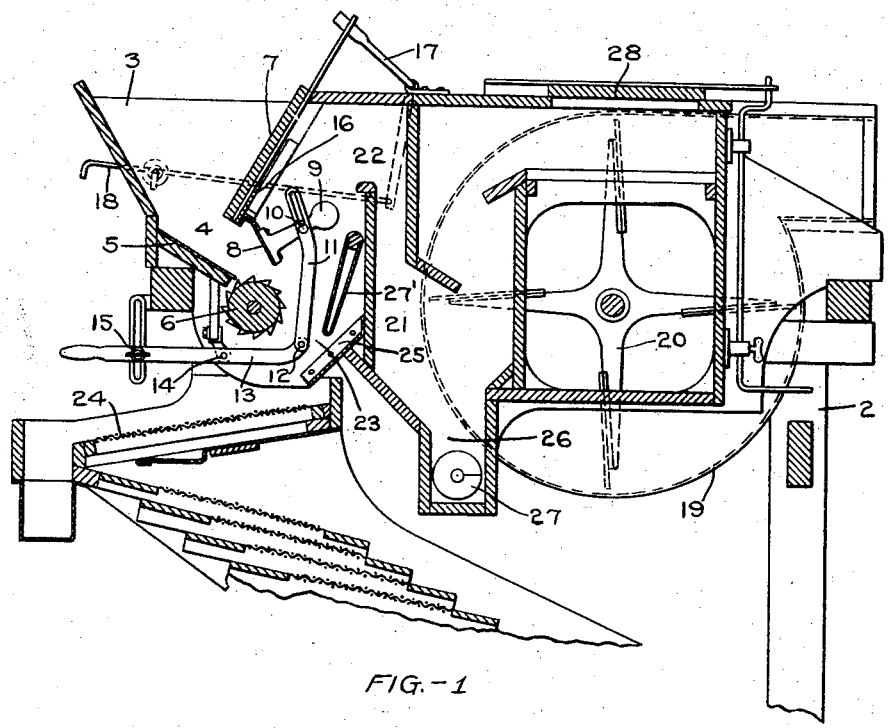
Figure 2:
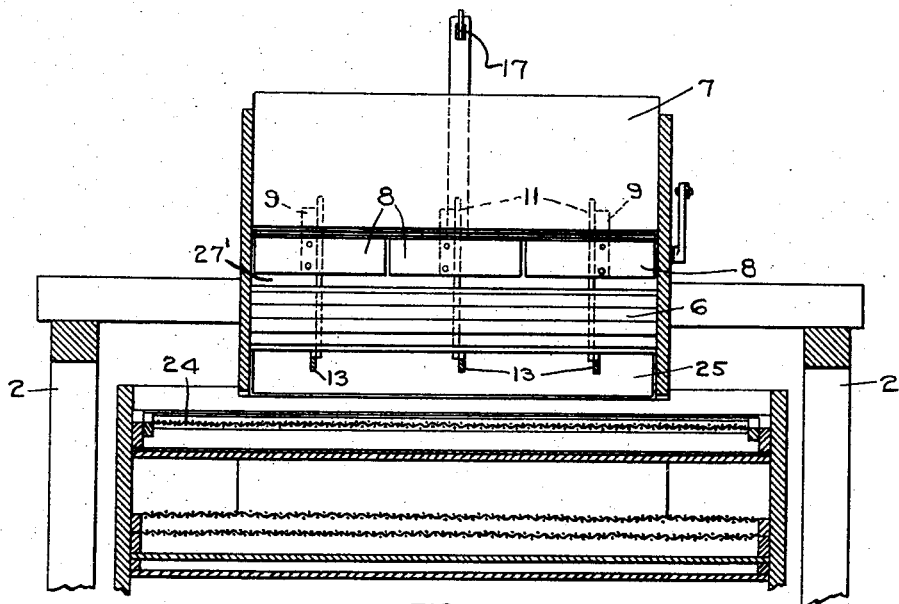

In the accompanying drawings forming part of this specification,

Figure 1 is a vertical sectional view through a grain cleaning machine embodying my invention, Fig. 2 is a vertical sectional view, on the line 2—2 of Fig. 1.

In the drawing, 2 represents the frame of the machine and 3 the hopper into which the grain to be cleaned is discharged by suitable means, not shown. The walls of the hopper are inclined in the usual way and at the bottom is a discharge throat 4 above an inclined feed plate 5 on which the grain rests in its passage through the throat. At the lower edge of the feed plate is a force feed roll 6 having a toothed periphery upon which the grain is delivered from the feed plate. The pressure, however, or weight of the grain is sustained by the plate so that as the grain passes off the lower end of the plate it will be engaged by the feed roll and advanced through the throat of the hopper without there being any material pressure of the grain on the roll which might tend to wedge or clog the feed. The hopper has an inclined wall 7 above the plate 4, the lower edge of which bounds the upper portion of the throat, and upon this wall a series of gates 8 are hinged. I have shown three of these gates, but a greater number may be employed if preferred. The lower edges of the gates rest by gravity upon the grain as it flows through the throat of the hopper, and each gate is preferably provided with a weight 9 which resists the upward movement of the gate but will allow it to yield and permit the passage through the throat of such foreign material as nails, bolts, straw, or pieces of wood which might accidentally pass into the hopper with the grain, and the lifting of the gates will prevent such foreign material from lodging and interrupting the overflow of the grain out of the hopper.

Each gate has a pin and slot connection at 10 with a bar 11 that is pivoted at 12 to a lever 13 pivoted at 14 and projecting outside the wall of the hopper, where it can be conveniently grasped by the operator for the purpose of shifting the bar 11 with respect to the pin sliding therein and thereby regulate the stroke of the gate.

Each lever 13 is locked by suitable means, such as the link and wing nut device 15. By loosening the wing nut, the levers may be adjusted independently of each other so that the throw of travel of the gates may be varied and as the hopper is of less width than the sieves, I prefer to adjust the lever of the middle gate so that it will have less stroke than the side gates. This will have the effect of directing the stream of grain from the center toward the side walls of the hopper and the side gates, opening wider than the middle one, will allow the grain to spread outwardly to the sides of the sieves beneath.

I also prefer to provide a gate 16 mounted to slide in the wall 7 connected with a crank 17 which is operated by means of a rod 18.

The gate 16 is free to slide with the movement of the crank toward or from the plate 5 and thereby regulate the cross-sectional area of the throat and whenever desired the feed may be stopped entirely by closing this valve and then all the grain which may have passed out of the hopper but is still somewhere on the sieves may be worked out of the machine until the sieves are entirely clear.

Near the hopper is a fan casing 19 for a suction fan 20. An air trunk 21 leads from this fan casing to a chamber 22 in the rear of the wall 7 and above the swinging gates. The lower portion of the chamber 2 communicates with a throat 23 through which the grain falls upon a sieve 24 beneath. This throat 23 has the feed roll on one side and an inclined plate 25 on the other side over which the grain falls upon the screen 24 beneath. In the passage of the grain through this throat, it is subjected to the suction of the fan and dust, chaff, fine pieces of straw, etc., are drawn out and up through the chamber 22 and the trunk 21, and deposited in the settling chamber 26 having a side delivery conveyer 27. For regulating the currents of air through the falling grain, I prefer to provide a vlave 27' mounted in the rear of the grain passage adjacent the wall of the trunk 21 and positioned to swing toward or from the feed roll and thereby increase or decrease the cross sectional area of the passage and the lifting force of the air currents passing therethrough, and thereby the separation of the dust and chaff from the grain may be regulated according to the condition of the grain, the size of the kernals, and the foreign matter therein.

I also prefer to provide a slide 28 in the top of the fan casing by means of which the air currents may be in a sense short-circuited or admitted directly to the fan, instead of being drawing through the grain passage.

In the operation of the machine, the grain is fed into the hopper and allowed to rest upon the feed plate in the bottom thereof and slide over upon the feed roll, the revolution of which will continuously advance the grain through the throat of the hopper for delivery upon the screen beneath. The position of the gates will determine the volume of the feed and one gate may be adjusted to open wider than the other gates, if preferred, while all of the gates will yield under pressure of any foreign material and allow it to pass through and drop upon the sieve beneath for discharge from the machine instead of sticking or wedging in the hopper and clogging the feed. By means of the air valve, the throat may be increased or decreased in cross-sectional area until the desired degree of suction is obtained for the proper separation of the chaff and fine material from the grain.

I do not wish to be confined to the particular arrangement or the manner of mounting the various devices in the hopper and air passage, as in various ways these details may be modified and still be within the scope of my invention.

I claim as my invention:

1. The combination, with a feed hopper having a discharge throat and an inclined feed plate in the bottom thereof, of a feed roll mounted to form a continuation of the surface of said feed plate and extending slightly above the same, a plurality of gates hinged to the wall of said hopper above said roll and having their lower ends adapted to swing back and forth above said roll to open or close said feed opening, said gates normally falling by gravity into said feed opening and mechanism engaging said gates for supporting them in an open or partially open position and comprising means for allowing said gates to move away from said feed opening under pressure of the grain flowing through said opening.

2. The combination, with a feed hopper having a discharge throat and feed plate in the bottom thereof, and a feed roll adjacent said plate and whereto the grain is delivered by gravity from said plate, of a plurality of gates supported above said feed roll and mounted to rest by gravity upon the stream of grain and yieldingly resist the flow thereof, said gates allowing foreign material to pass through said throat with the grain and levers mounted to adjust said gates independently of one another to increase or decrease the width of the feed opening, said levers positively holding said gates against closing but permitting them to open wider under pressure of the material thereon.

3. The combination, with a feed hopper having a discharge throat, of a plurality of gates pivotally supported in said throat and mounted to move upward under pressure of the grain to allow foreign articles in the grain to pass through said throat, bars having pin and slot connections with said gates respectively, and levers for adjusting said bars and limiting the movement of said gates.

In witness whereof, I have hereunto set my hand this 8th day of December 1917.

RICHARD L. OWENS.